United States Patent [19]
Hild et al.

[11] Patent Number: 5,383,275
[45] Date of Patent: Jan. 24, 1995

[54] HAND PLANER

[75] Inventors: Eugen Hild, Aichtal; Kai-Uwe Floettmann, Guetersloh, both of Germany

[73] Assignee: Robert Bosch GmbH, Stuttgart, Germany

[21] Appl. No.: 75,522
[22] PCT Filed: Oct. 14, 1992
[86] PCT No.: PCT/DE92/00867
§ 371 Date: Jun. 11, 1993
§ 102(e) Date: Jun. 11, 1993
[87] PCT Pub. No.: WO93/08004
PCT Pub. Date: Apr. 29, 1993

[30] Foreign Application Priority Data

Oct. 22, 1991 [DE] Germany .................. 4134768

[51] Int. Cl.⁶ .................. B27C 1/10
[52] U.S. Cl. .................. 30/475; 30/477; 144/117 C; 144/252 R; 409/137; 409/295
[58] Field of Search .......... 408/710; 51/273; 409/137, 175, 181, 295; 30/475, 476, 477; 144/127 C, 252 R

[56] References Cited

U.S. PATENT DOCUMENTS

| | | | |
|---|---|---|---|
| 4,601,104 | 7/1986 | Zaiser et al. | 30/475 |
| 5,007,469 | 4/1991 | Englert et al. | 144/252 R |
| 5,034,041 | 7/1991 | Austin | 144/252 R |
| 5,094,000 | 3/1992 | Becht et al. | 30/475 |

FOREIGN PATENT DOCUMENTS

| | | |
|---|---|---|
| 2471262 | 6/1981 | France . |
| 1080764 | 4/1960 | Germany . |
| 7131774 | 7/1975 | Germany . |
| 8631998 | 1/1987 | Germany . |
| 3542263 | 4/1987 | Germany . |
| 3406728 | 8/2985 | Germany . |

Primary Examiner—W. Donald Bray
Attorney, Agent, or Firm—Michael J. Striker

[57] ABSTRACT

A hand planer comprises a housing, a planer head supported in the housing, a motor driving the planer head, a fan blower connected with the motor for generating a flow of air for moving chips, a chip ejector, two air guidance ducts through which the flow of air is guided from the fan blower to the chip ejector, a chip conveying duct having a chip discharge opening such that planed chips exit the chip conveying duct through the chip discharge opening, the chip ejector accommodating both the chips and the flow of air, and guides for guiding the flow of air in a switchable manner to the chip conveying duct via one of the two air guidance ducts. Therefore the problem of ejecting the chips in a preselected direction with extreme precision and high efficiency is met.

13 Claims, 3 Drawing Sheets

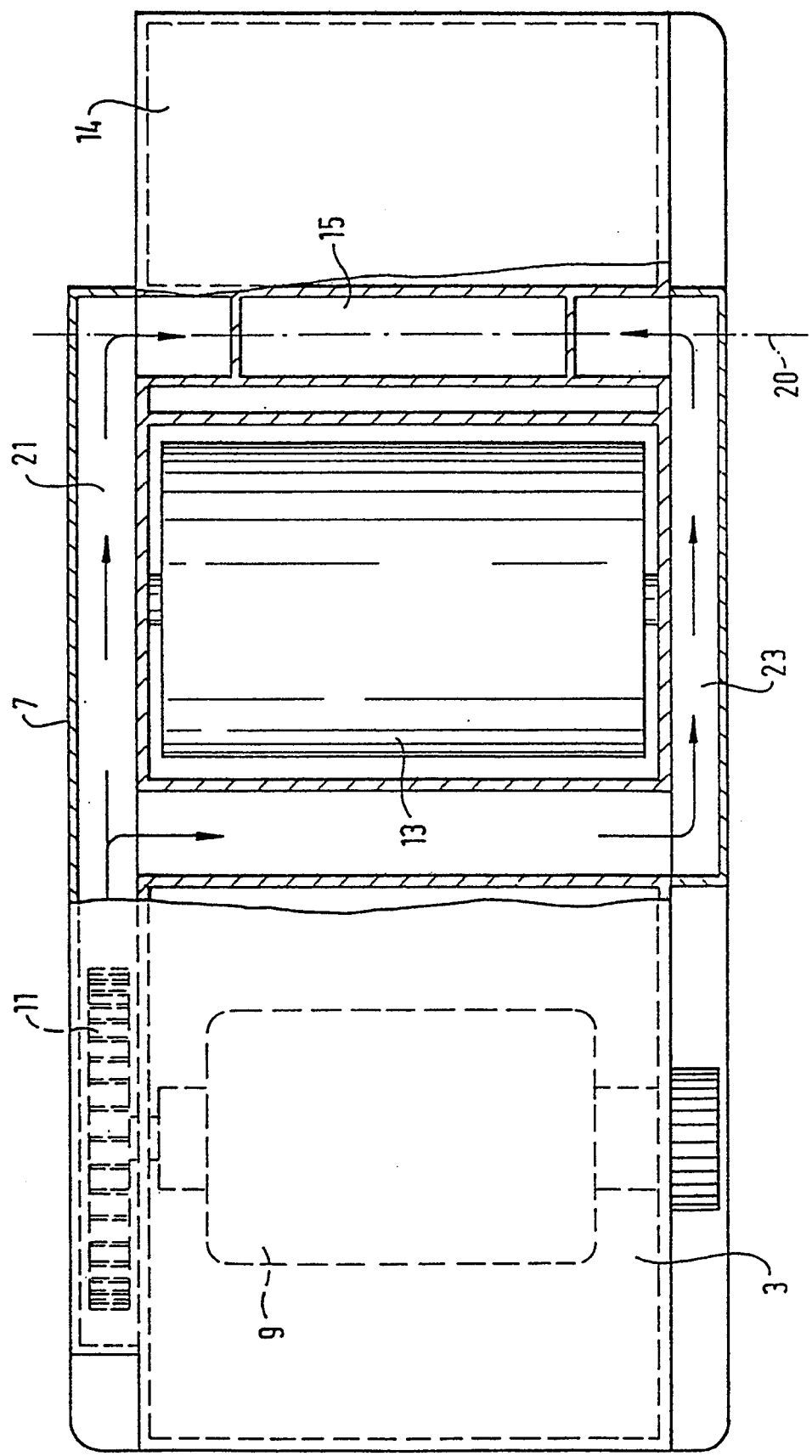

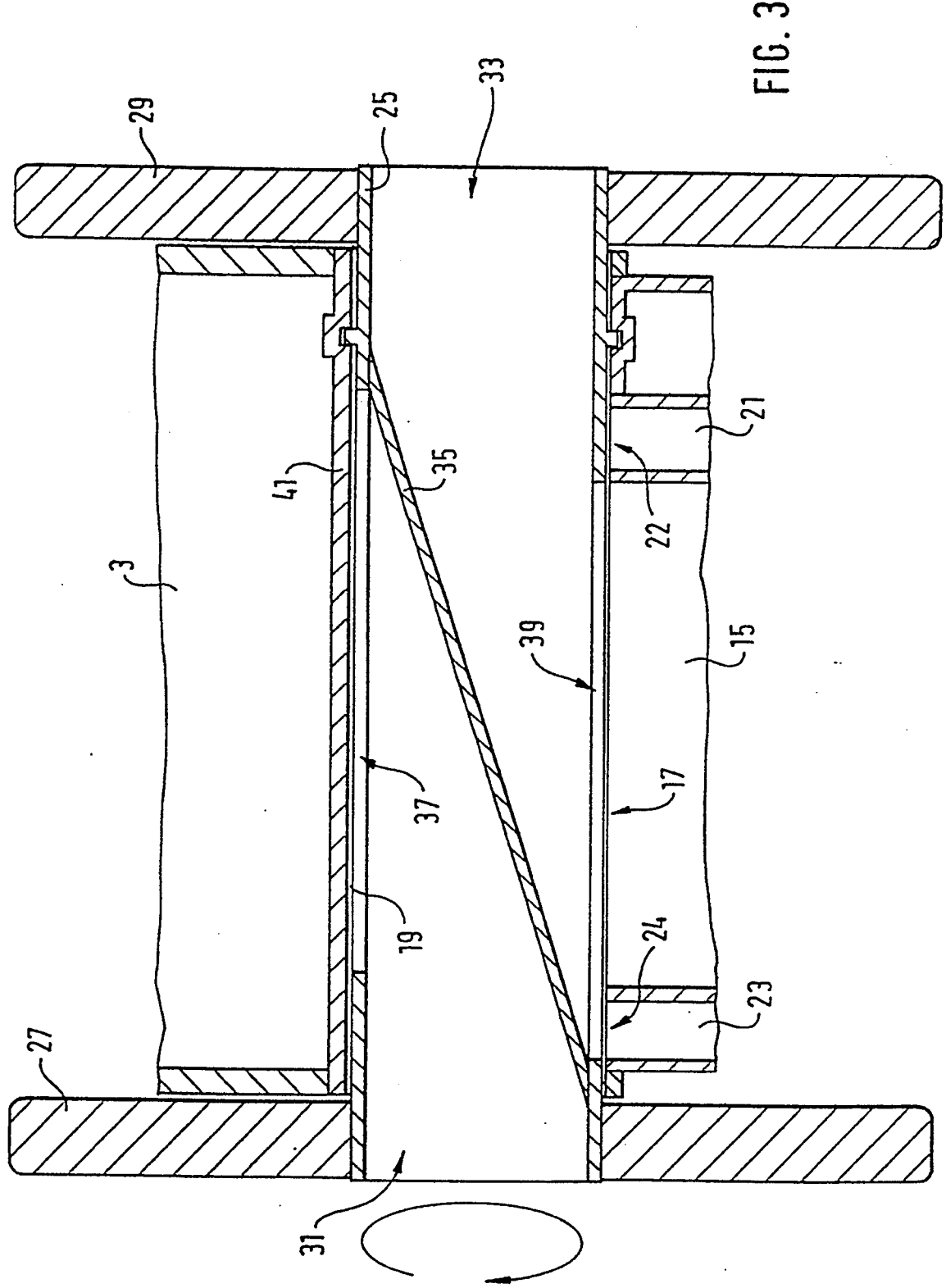

HAND PLANER

BACKGROUND OF THE INVENTION

The present invention relates to a hand planer.

More particularly, it relates to a hand planer having a housing supporting a planer head rotatable by a motor, a fan blower connected with the motor for generating a flow of air for moving chips, a chip ejector to which the flow of air is guided via air guidance ducts, and a chip conveying duct through the planer chips exit.

A hand planer of the generic type is known from DE-OS 34 06 728. In this hand planer the chips are discharged from a chip discharge opening of a chip conveying duct by the pumping and sucking action of one or two streams of cooling air to two chip ejecting openings which can be opened alternately in an optional manner. The chip ejecting opening can be unblocked toward one side or the other transversely to the feed direction by a swivelable, flap-type valve. This hand planer has the disadvantage that the removal of chips via the cooling air flow at or in the chip conveying duct proceeds with inadequate efficiency, i.e. an excessive air flow rate is required for a small quantity of chips.

The known hand planer is described in two embodiment examples. In the embodiment example with only one cooling air flow, the conveying effect is fully effective only in a preferred direction, namely when the cooling air can flow substantially parallel to the flap-like valve toward the ejecting opening.

However, if the ejecting opening directed opposite to the preferred direction is preselected rather than the preferred direction, the cooling air flow rebounds off the flap-like valve virtually normally thereto and the velocity of the air flow, and accordingly the conveying effect, is reduced as a result of turbulence. The chip conveying duct can become stopped in this way.

In the embodiment example with two cooling air flows acting simultaneously at both sides of the chip discharge opening, the conveying effect is improved, but the turbulence is also increased in the region of the valve. Accordingly, the efficiency with which the chips are moved is still definitely reduced. This makes poor use of the available conveying capacity.

Further disadvantages of the hand planer include the relatively poor sealing effect of the valve and a constant, unintentional escape of chips from the ejecting opening which is closed per se, as well as the poor possibility of distinguishing the selected chip ejecting direction and the trouble-prone character of the expensively constructed valve bearing.

SUMMARY OF THE INVENTION

Accordingly, it is an object of the present invention to provide a hand planer of the above mentioned general type, which avoids the disadvantages of the prior art.

In keeping with these objects and with others which will become apparent hereinafter, one feature of the present invention resides, briefly stated, in a hand planer, in which means are provided for guiding the entire flow of air in a switchable manner to the chip conveying duct via one of the two air guidance ducts.

When the hand planer is designed in accordance with the present invention, it has the advantage over the prior art that the chips are carried off in every ejecting direction with the same high quality. Moreover, the valve of the switching means is sealed particularly well so that each ejecting direction is determined in a definite manner and no chips can be ejected or interference by sawdust caused in an unintended direction. The selected ejecting direction can be distinguished particularly well at the valve and the adjustment of the valve is extremely simple. Moreover, the valve is constructed in a robust manner and is simple to produce. Disturbances are practically eliminated.

Further advantageous constructions of the invention follow from the dependent claims. The chips are carried off equally well in both ejecting directions, in both cases better than is known in the prior art, because the air guidance duct producing the most effective ejecting and suction pumping effect by blowing over the chip discharge opening is always opened.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a view of the embodiment example according to FIG. 1 from below;

FIG. 3 shows an enlarged view of the valve of the embodiment example according to FIG. 1.

DESCRIPTION OF THE PREFERRED EMBODIMENTS

Figure 1:
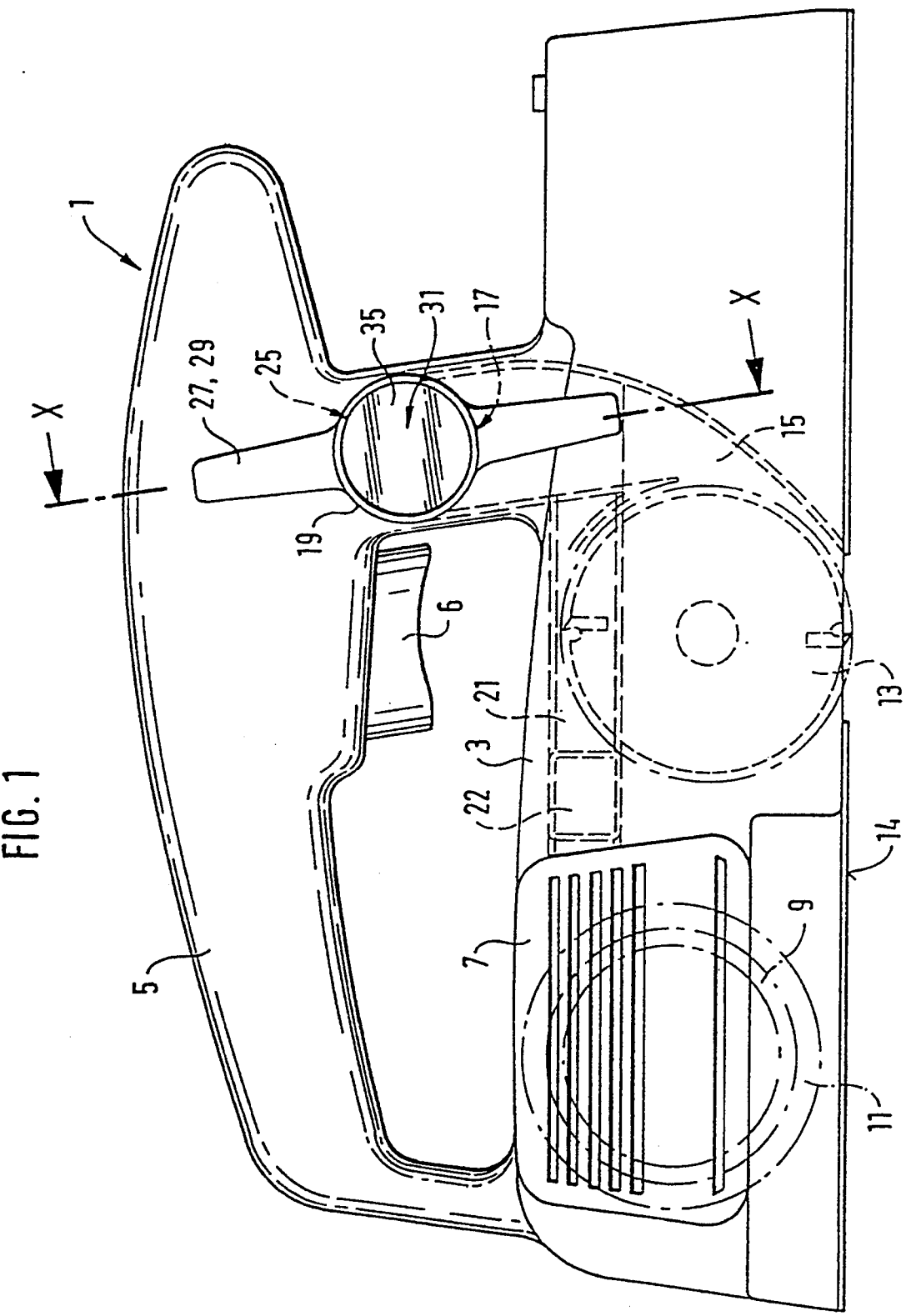
FIG. 1 shows a side view of a hand planer according to the invention.

The hand planer 1 shown in a side view in FIG. 1 includes a housing 3 with handle 5 and a lateral covering 7, below which is arranged an electric motor 9, shown only schematically, having a fan blower 11 arranged axially thereon. A planer head 13, which is also only shown schematically, is supported parallel to the electric motor 9 in the housing 3 of the hand planer 1. A curved chip conveying duct 15 which leads away tangentially from the planer roller 13 upward in the direction of the handle 5 terminates in a chip discharge opening 17. The latter opens into a hollow cylindrical guide body 19 which is arranged above the planer head 13 parallel to the latter.

The openings of a first and second air guidance duct 21, 23, the latter only being shown schematically, open into the guide body 19 adjacent to the chip discharge opening 17 on opposite sides. These air guidance ducts 21, 23 have an inlet opening, not shown in more detail, which leads to the fan blower 11 and extend under the covering 7. The first air guidance duct 21 leads to its port 22 adjacent to the cylindrical guide body 19 after only one turn. The second air guidance duct 23 branches off from the first air guidance duct 21 to the opposite side of the hand planer 1, from which it leads to the hollow cylindrical guide body 19 and to its port 24 via two elbow-shaped curves which are not shown in more detail.

A tubular valve 25 is supported in the guide body 19 so as to be rotatable around its axis, but so as to be secured against axial displacement. The valve 25 carries toggle-like handles 27, 29 on either side of the housing 3. A first ejecting opening 31 leads out in the direction of the plane of projection. A second ejecting opening 33, not shown in more detail, corresponds to the first ejecting opening 33 and faces in the opposite direction symmetrically with respect to the latter. A dividing wall 35 is arranged in a sealing manner in the interior of the valve 25 in the manner of an oblique plane so as to form two symmetric interior spaces which are separated from one another.

FIG. 2 shows the base 14 of the hand planer from below in a horizontal projection in partial section. The electric motor 9 with the fan blower 11 arranged axially thereon is visible in the housing 3. The cover 7 is tightly fastened on the housing 3 in the axial direction relative to the fan blower 11. The first air guidance duct 21 extends below this cover 7 and leads in the longitudinal direction of the planer 1 past the planer head 13 up to the chip conveying duct 15, from which it leads into a first elbow-shaped curve into the interior of the hand planer 1 and then in another curve vertically upward parallel to the chip conveying duct 15 until the guide body 19 with axis 20.

The second air guidance duct 23 branches off from the first air guidance duct 21 in front of and parallel to the planer head 13 and leads horizontally via a first substantially right-angled curve to the chip conveying duct 15, from which it leads into the interior of the housing 3 in another elbow-shaped curve parallel to the planer head 13 and then runs upward directly into a last elbow-shaped curve to the guide body 19 parallel to the chip conveying duct 15.

FIG. 3 shows an enlarged partial view of section X—X from FIG. 1. The housing 3 forms the hollow cylindrical guide body 19 above the planer head, not shown, the tubular valve 25 being arranged in the latter in a manner not shown in greater detail so as to be secured against axial displacement and rotatably supported. Handles 27, 29 are arranged at the ends of the valve 25. A dividing wall 35 which extends inside the valve 25 serves to divide the interior of the valve 25 symmetrically into two equal portions which are sealed relative to one another.

The first ejecting opening 31 is situated on the left-hand side and the second ejecting opening 33 is situated on the right-hand side. Window-like radial apertures 37, 39 of identical dimensions are situated in opposite sides of the wall of the valve 25 so as to be offset relative to one another.

The first air guidance duct 21 and second air guidance duct 23 lead from below on both sides of the chip conveying duct 15 to the guide body 19. The ports 22, 24 close flush with the chip discharge opening 17 of the chip conveying duct 15.

In the position of the valve 25 shown in FIG. 3, the port 22 of the first air guidance duct 21 is closed by the tubular wall of the valve 25, whereas the port 24 of the second air guidance duct 23 and the chip discharge opening 17 overlap with the radial aperture 39. The second ejecting opening 33 is accordingly activated in this position.

When the electric motor 9 is switched on via the on/off switch 6, the rotating fan blower 11 generates a flow of air which reaches the second ejecting opening 33 via the port 24 of the second air guidance duct 23 and via the radial aperture 39. This air flows over the chip discharge opening 17 and chips located in the chip conveying duct 15 are conveyed by the air in the manner of a suction pump so as to blow out through the ejecting opening 33.

The radial aperture 37 leading to the chip discharge opening 17 and the port 22 of the first air guidance duct 21 are positioned by rotating the valve 25 by 180° around its axis. In this position, the port 24 of the second air guidance duct 23 is closed by the tubular wall of the valve 25. When the electric motor 9 is actuated in the manner described above, the fan blower 11 generates a flow of air which flows along the first air guidance duct 21 out of the chip discharge opening 17 entirely from the port 22. In this possible position of the valve 25, the flow of air passing through the port 22 of the air guidance duct 21 blows the chips located in the chip conveying duct 15 toward the first ejecting opening 31.

In every position, the best possible suction pumping effect is ensured via the selected air guidance ducts 21, 23. Due to the fact that the radial apertures 37, 39 lie diametrically opposite one another and are divided from one another so as to be fully sealed relative to one another, the chips cannot be ejected simultaneously via both ejecting openings 31, 33 in an unintentional manner.

In an embodiment example of the invention which is not shown in the drawing, an additional, external suction unit can be coupled to each chip ejecting opening and only one handle is arranged at the valve so that the hand planer is lighter and less costly to produce.

It will be understood that each of the elements described above, or two or more together, may also find a useful application in other types of constructions differing from the types described above.

While the invention has been illustrated and described as embodied in a hand planer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; and means for guiding the flow of air in a switchable manner to said chip conveying duct via one of said two air guidance ducts, said chip discharge opening being formed so that the flow of air is guided past said chip discharge opening exclusively for generating an injector suction action via said chip discharge opening.

2. A hand planer as defined in claim 1, wherein said air guidance ducts form ports located adjacent to said chip discharge opening.

3. A hand planer as defined in claim 2, wherein said ports of said air guidance ducts have an axis which extends parallel to said chip conveying duct.

4. A hand planer as defined in claim 1; and further comprising toggle-like handles arranged at opposite ends of said air guiding means.

5. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; and means for guiding the flow of air in a switchable manner to said chip conveying duct via one of said two air guidance ducts, said chip ejector having a first ejector opening located at one side of the hand planer and a second ejector opening located on the other side of the hand planer, said guiding means including a tubular air directing valve arranged so as to be rotatable for switching the air flow at said chip discharge opening between a first axial rotating position in which the chips are injected via said first ejector opening and a second axial rotating position in which the chips are ejected through said second ejector opening.

6. A hand planer as defined in claim 5, wherein said air directing valve has a dividing wall an a cylinder wall provided with associated apertures.

7. A hand planer as defined in claim 6, wherein said cylinder wall of said air directing valve has an axis, said dividing wall being inclined relative to said axis.

8. A hand planer as defined in claim 6, wherein said apertures are located radially on opposite sides of said cylinder wall, said dividing wall dividing an interior of said cylinder wall into two areas of equal dimensions which are sealed relative to one another.

9. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; and means for guiding the flow of air in a switchable manner to said chip conveying duct via one of said two air guidance ducts, said air guidance ducts form ports located adjacent to said chip discharge opening, said ports of said air guidance ducts having an axis which extends transversely to said chip conveying duct.

10. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air: and means for guiding the flow of air in a switchable manner to said chip conveying duct via one of said two air guidance ducts, said air guidance ducts form ports located adjacent to said chip discharge opening, said ports of said air guidance ducts being symmetrical relative to said chip discharge opening.

11. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; and means for guiding the flow of air in a switchable manner to said chip conveying duct via one of said two air guidance ducts, said air guidance ducts form ports located adjacent to said chip discharge opening, one of said ports of said air guidance ducts being always closed, while another of said ports is open, said open port being located at a greater distance from said chip ejector than said chip discharge opening.

12. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; and means for guiding the flow of air in a switchable manner to said chip conveying duct via one of said two air guidance ducts, said housing having a hollow cylindrical guide body, said air directing valve being arranged so as to be rotatable in said hollow cylindrical guide body, said air guiding ducts have ports which together with said chip discharge opening entering said guide body radially, said apertures overlapping with said air discharge opening.

13. A hand planer, comprising a housing; a planer head supported in said housing; a motor driving said planer head; a fan blower connected with said motor for generating a flow of air for moving chips; a chip ejector; two air guidance ducts through which the flow of air is guided from said fan blower to said chip ejector; a chip conveying duct having a chip discharge opening such that planed chips exit said chip conveying duct through said chip discharge opening, said chip ejector accommodating both the chips and the flow of air; means for guiding the flow of air in a switchable manner to said chip conveying duct via one of said two air guidance ducts; and toggle-like handles arranged at opposite ends of said air guiding means.

* * * * *